(12) United States Patent
Olston (10) Patent No.: US 8,732,160 B2
(45) Date of Patent: May 20, 2014

(54) EXPLORING LARGE TEXTUAL DATA SETS VIA INTERACTIVE AGGREGATION

(75) Inventor: Christopher Olston, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 714 days.

(21) Appl. No.: 12/268,956

(22) Filed: Nov. 11, 2008

(65) Prior Publication Data

US 2010/0121847 A1 May 13, 2010

(51) Int. Cl.
*G06F 17/30* (2006.01)

(52) U.S. Cl.
USPC .......................... 707/715; 707/719; 707/745

(58) Field of Classification Search
USPC .......................... 707/715, 741, 719
See application file for complete search history.

(56) References Cited

U.S. PATENT DOCUMENTS

| | | | | |
|---|---|---|---|---|
| 6,032,151 | A * | 2/2000 | Arnold et al. | 1/1 |
| 6,336,111 | B1 * | 1/2002 | Ashby et al. | 707/715 |
| 2005/0065925 | A1* | 3/2005 | Weissman et al. | 707/4 |
| 2010/0070448 | A1* | 3/2010 | Omoigui | 706/47 |

OTHER PUBLICATIONS

SearchTools.com, Searching for Text Information in Databases, archived by web.archive.org on Sep. 19, 2008, accessed Jan. 31, 2012.*
Burleson, Tuning Oracle Full-table Scans, Aug. 1, 2004, accessed Jan. 31, 2012.*
Meier et al., How to Optimize SQL Indexes, May 2004, accessed Jan. 31, 2012.*
Ng et al., Dynamic query re-optimization, Eleventh International Conference on Scientific and Statistical Database Management, 1999.*
Dubois, MySQL Query Optimization, Apr. 22, 2005.*

* cited by examiner

*Primary Examiner* — Hung Q Pham
*Assistant Examiner* — William Spieler
(74) *Attorney, Agent, or Firm* — James J. DeCarlo; Greenberg Traurig, LLP (57) ABSTRACT

A method and a system are provided for exploring a large textual data set via interactive aggregation. In one example, the method includes receiving the large textual data set and an original query template, building an index for the query template, wherein the building the index comprises ordering the index a particular way to optimize query time, receiving one or more bindings for the original query template, computing an answer to the original query template using the index and the one or more bindings, and anticipating one or more future queries that a user may submit and that are related to the original query template.

21 Claims, 4 Drawing Sheets

FIG. 1

| tid | group attribute | dimension attributes | | | | | | | |
|---|---|---|---|---|---|---|---|---|---|
| | | keywords | | categories | | booleans | | | |
| | website | "music" | "free" | french | audio | spam | ¬ spam | porn | ¬ porn |
| 1 | apache.org | 0 | 1 | 0 | 0 | 0 | 1 | 0 | 1 |
| 2 | amazon.com | 0 | 0 | 0 | 0 | 0 | 1 | 0 | 1 |
| 3 | amazon.com | 1 | 0 | 0 | 1 | 0 | 1 | 0 | 1 |
| 4 | c'est_spam.fr | 0 | 0 | 1 | 0 | 1 | 0 | 0 | 1 |
| 5 | free.fr | 0 | 1 | 1 | 0 | 0 | 1 | 0 | 1 |
| 6 | amazon.com | 1 | 0 | 0 | 0 | 0 | 1 | 0 | 1 |
| 7 | adult.com | 0 | 1 | 0 | 0 | 0 | 1 | 1 | 0 |
| 8 | free.fr | 1 | 1 | 1 | 1 | 0 | 1 | 0 | 1 |

EXPLORING LARGE TEXTUAL DATA SETS VIA INTERACTIVE AGGREGATION

FIELD OF THE INVENTION

The present invention relates to techniques for performing database queries. More particularly, the present invention relates to techniques for exploring large textual data sets via interactive aggregation.

BACKGROUND OF THE INVENTION

Tremendous quantities of valuable text data are appearing on the Internet. Tools are needed to help researchers understand this data. Most existing tools are geared toward batch analysis: The user formulates a query, waits for a backend engine (e.g., database or map-reduce system) to execute the query, waits for a visualization tool to render the result, and inspects the rendered result. Typically the user then formulates a new query related to the original query, and re-invokes the execute-and-render pipeline. This process continues until the user reaches a sufficient understanding of the data. Unfortunately, if the data set is large, each execute-and-render iteration takes a long time and the process is not interactive.

SUMMARY OF THE INVENTION

What is needed is an improved method having features for addressing the problems mentioned above and new features not yet discussed. Broadly speaking, the present invention fills these needs by providing a method and a system for exploring a large textual data set via interactive aggregation. It should be appreciated that the present invention can be implemented in numerous ways, including as a method, a process, an apparatus, a system or a device. Inventive embodiments of the present invention are summarized below.

In one embodiment, a method is provided for exploring a large textual data set via interactive aggregation. The method comprises receiving the large textual data set and an original query template, building an index for the query template, wherein the building the index comprises ordering the index a particular way to optimize query time, receiving one or more bindings for the original query template, computing an answer to the original query template using the index and the one or more bindings, and anticipating one or more future queries that a user may submit and that are related to the original query template.

In another embodiment, a system is provided for exploring a large textual data set via interactive aggregation. The system is configured for receiving the large textual data set and an original query template, building an index for the query template, wherein the building the index comprises ordering the index a particular way to optimize query time, receiving one or more bindings for the original query template, computing an answer to the original query template using the index and the one or more bindings, and anticipating one or more future queries that a user may submit and that are related to the original query template.

In still another embodiment, a computer readable medium is provided carrying one or more instructions for exploring a large textual data set via interactive aggregation. The one or more instructions, when executed by one or more processors, cause the one or more processors to perform the steps of receiving the large textual data set and an original query template, building an index for the query template, wherein the building the index comprises ordering the index a particular way to optimize query time, receiving one or more bindings for the original query template, computing an answer to the original query template using the index and the one or more bindings, and anticipating one or more future queries that a user may submit and that are related to the original query template.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention is provided for a method and a system for exploring a large textual data set via interactive aggregation. Numerous specific details are set forth in order to provide a thorough understanding of the present invention. It will be understood, however, to one skilled in the art, that the present invention may be practiced with other specific details.

Section 1: Overview

Provided here is an aggregation device for interactive analysis of textual data. A query with the aggregation device consists of a conjunctive keyword restriction followed by a group-by-aggregation expression, the result of which is rendered on the screen for the user. This class of queries is inspired by OLAP (online analytical processing), and provides a useful way to explore high-dimensional text data. To explore the data, the user adjusts the keyword restriction interactively, and observes how the displayed aggregate result changes. The aggregation device is able to process a new query variant in just a few seconds over a multi-gigabyte data set, thus enabling real-time exploration.

Unlike OLAP tools, the aggregation device must cope with millions of dimensions. Consequently, even though the data is sparse, the dense portion of the datacube is too large to pre-compute offline. Online strategies based on indexes are too slow. To overcome these challenges, the aggregation device here incorporates two novel techniques: (1) a new physical layout for indexed text data that minimizes seeks, and (2) background computation of neighboring datacube regions. These techniques are described below.

Large textual data sets are in abundance. The term "large textual data set" refers to a textual data set with a large size that makes conventional query methods cumbersome. A large textual data set is typically one gigabyte or more. Examples of textual data sets are web pages, news, email, blogs, tagging systems. Textual data sets hold significant value to various scientific, governmental and corporate bodies, which devote substantial resources to analyzing them. While many statistical summary and visualization techniques exist for textual data, static summaries of the data are insufficient for most real-world data analysis tasks. Typically, rigorous statistical analysis is preceded by an informal, interactive data exploration process. During the interactive phase, the analyst generally iterates many times over the data, often by issuing a series of interrelated queries, to get a comprehensive feel for the data.

Tools to support interactive exploration of textual data are needed. An OLAP-style approach that treats text terms as dimensions yields a useful way to explore the data. Unfortunately, OLAP tools are not designed to handle the very high dimensionality present in textual data. The typical approach for making OLAP systems "online" is to precompute the underlying data cube, or at least the regions of the cube that aggregate a large quantity of raw data. For textual data sets, even in the presence of significant sparsity it can be infeasible to compute the dense portion of the cube (see Section 2.4.2 for measurements).

An alternative is to rely on indexes to compute cube regions on demand [13]. Unfortunately text indexing technology, which has primarily been developed for information retrieval, is geared toward retrieving only the top few results rather than aggregating all the results. Consequently, for large data sets index-based query processing can be too slow for interactive exploration (index performance is measured in Section 2.4.1), except for queries that are highly selective (i.e., ones that have a small result set to be aggregated). Approximate results can be obtained by stopping early (i.e., not scanning all the results), but this approach is only applicable to highly unselective queries which yield adequate sample sizes. For most queries, the processing is either too slow or too inaccurate.

Introduced here are two novel techniques, which together enable truly interactive exploration of textual data. The first technique, provided in Section 3, is a physical index layout strategy that reduces disk seeks for moderately selective queries, thereby improving their performance substantially. The second technique, provided in Section 4, performs background precomputation of queries related to the current query. This approach is motivated by the fact that data exploration sessions tend to involve a series of refinements to a starting query, e.g., successive drill-downs of the form {"music"}→{"music," "download"}→{"free," "music," "download"}. The user's "think time" at each step can be utilized to precompute likely follow-on queries.

The remainder of this description is organized as follows. In Section 2 a formal description of the problem is given, and several strawman solutions are discussed. In Sections 3 and 4, the techniques aimed at improving the response times of user interactions are provided. In Section 5, an overview of the basic method is discussed. In Section 6, a computer readable medium implementation is provided. Then, in Section 7, advantages of the aggregation device are discussed.

Section 2: Problem Overview

Described here are the basic data exploration interface implemented by the aggregation device, and its underlying data and query model. A real-world data set used to evaluate the aggregation device is then described. Lastly, some strawman implementation approaches are introduced, and their strengths and weaknesses are discussed.

Section 2.1: Data Exploration Interface

Figure 1:
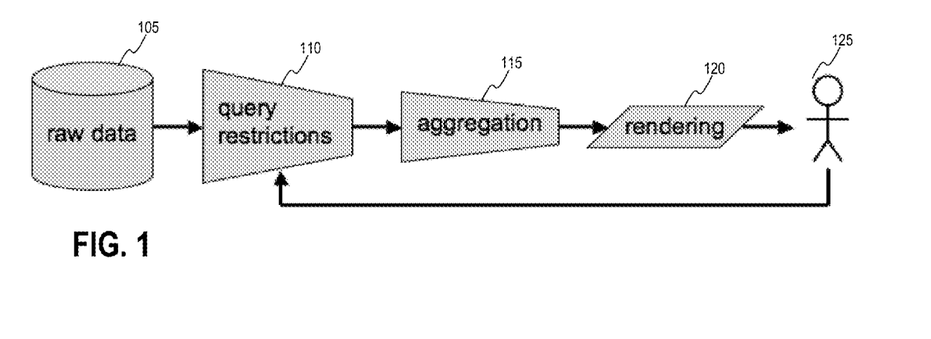
FIG. 1 is a block diagram that illustrates data and control flow with respect to the aggregation device, in accordance with an embodiment of the present invention.

FIG. 1 is a block diagram that illustrates data and control flow with respect to the aggregation device 115, in accordance with an embodiment of the present invention. The term "device" means hardware, software or a combination thereof. A device may sometimes be referred to as an apparatus. Each device is configured to carry out one or more steps of the method of exploring large textual data sets via interactive aggregation. The data flows from a raw data database 105 through the query restrictions device 110, then through the aggregation device 115, and then through the rendering device 120, which renders the data on a user computer (not shown) for the user 125. At any time the user can manipulate the query restrictions in the query restrictions device 110, causing the aggregation device 115 and rendering device 120 to perform reevaluations.

The present implementation supports three kinds of query restrictions: (1) general keywords found in the document title, referring anchortext, etc.; (2) categorical attributes such as language and file type; (3) Boolean attributes such as whether a document has been classified as spam, porn, or a (near-) duplicate copy of another document. The web crawl data set here has around one hundred categorical and Boolean attributes, and millions of keyword attributes. (There are also numerical attributes such as frequency of change, but treatment of numerical data is outside the scope of this paper.)

Section 2.2: Data and Query Model

A data set being explored via the aggregation device can be thought of as a relational table with the following attributes:
 One or more group attributes (e.g., website affiliation).
 Zero or more aggregation attributes (in the case of count-based aggregation, no aggregation attribute is required).
 One binary dimension attribute for each unique keyword in the data set.
 Additional binary dimension attributes corresponding to each distinct category for each categorical attribute.
 Additional binary dimension attributes corresponding to each truth value for each Boolean attribute.

Figure 2:
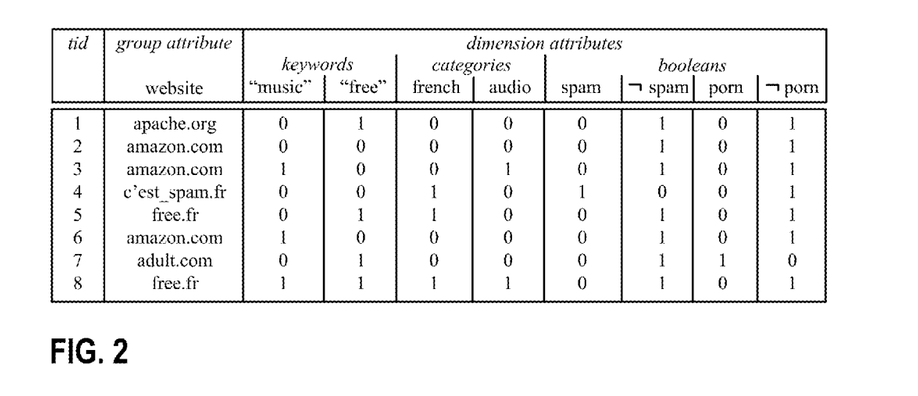
FIG. 2 is an example data set being explored via the aggregation device, in accordance with an embodiment of the present invention.

FIG. 2 is an example data set being explored via the aggregation device, in accordance with an embodiment of the present invention. This data set is a simple binary model that is adopted here for convenience because it allows uniform treatment of all three kinds of attributes. However, in most data sets the number of keyword attributes dwarfs the number of categories and truth values of Boolean attributes. So, the dimensionality increase incurred by treating categories and truth values as distinct dimensions is negligible.

The notation used in this description is summarized in Table 1:

TABLE 1

Notation.

| symbol | meaning |
| --- | --- |
| T | raw data table |
| n | number of rows in T |
| m | number of dimension attributes in T |
| $A_i$ | ith dimension attribute |
| $A_i(t) \in \{0,1\}$ | value of $A_i$ in tuple t |
| $A_i(q) \in \{0,1\}$ | value of $A_i$ in query q |
| $R(q) \subseteq T$ | result set of query q |
| $s(q) \in [0,n]$ | selectivity of q ($s(q) = |R(q)|$) |
| $s(A_i) \in [0,n]$ | selectivity of query $\{A_i\}$ |
| $s^* \in [0,n]$ | max. selectivity for fast processing |

TABLE 1-continued

Notation.

| symbol | meaning |
| --- | --- |
| $s_r^* \in [0,n]$ | s* value for randomly ordered index |
| $s_s^* \in [0,n]$ | s* value for semi-clustered index |

Let T denote the table being explored, which is of cardinality n (i.e., T has n rows). Let m be the total number of dimension attributes (i.e., the number of columns, excluding the group and aggregation columns), denoted $A=(A_1, A_2, \ldots, A_m)$. (For simplicity, dimension attributes are referred to as attributes in the remainder of this description.) For a given tuple $t \in T$ let $A_k(t)$ denote the value of the $k^{th}$ attribute, where $k \in \{1, 2, \ldots, m\}$ and $A_k(t) \in \{0,1\}$.

A query restriction (query, for short) is a bit vector of length m, denoted $q=(A_1(q), A_2(q), \ldots, A_m(q))$ where $A_k(q) \in \{0,1\}$. For example, referring to row 3 of FIG. 2, the query {"music," audio, ¬spam, ¬porn} would be represented by the bit vector {1, 0, 0, 1, 0, 1, 0, 1}. A single-attribute query is a query that has exactly one bit set to "1"; a two-attribute query is one that has exactly two bits set to "1", and so on.

Let the result set $R(q) \subset T$ of query q be defined as $R(q) = \{t \in T: \forall k \in \{1, 2, \ldots, m\}, \overline{A_k}(q) \Rightarrow A_k(t)\}$, i.e., tuples that have a "1" in every column for which q has a "1". Let the selectivity $s(q) \in [0,n]$ of query q be defined as $s(q)=|R(q)|$. Let $s(A_k)$ denote the selectivity of attribute $A_k$, i.e., the selectivity of the single-attribute query with only the k th bit set to "1".

Section 2.3: Web Crawl Data Set

Before exploring possible approaches to this problem, a real-world data set is described that is used as a running example throughout this description. A modest-size web crawl containing ten million documents was gathered; referring anchortext was used as the primary textual feature. (It is well known in the web community that referring anchortext is typically a more reliable source of information about a document than the document content itself.) Other textual features include the document title, and the URLs (Uniform Resource Locators) linking to and linked from the document. Classifiers were used to derive the several dozen categorical and Boolean attributes, including: language (English, French, German, etc.), document type (text, audio, video), and whether or not the text is, for example, spam, porn, links to spam, links to porn, crawler trap, or publicly editable (e.g., blog or twiki page). The raw data is about 9 GB in size.

Section 2.4: Strawman Approaches

Discussed here are some obvious implementation strategies. Also, their drawbacks are revealed.

Section 2.4.1: Indexed Retrieval

Text indexing technology is well-suited to high-dimensional data, so one natural approach is to view the present problem as a text retrieval problem, with an aggregation function applied to the retrieved results. A similar observation has led to an index-based approach for OLAP.

The feasibility of the index-based approach in the present context is studied using the web crawl data set described in Section 2.3. The performance of a workload of queries of the form described in Section 2.2 are tested on a commodity laptop computer with 1 GB of memory, running in a Java virtual machine configured to use 500 MB of physical memory, which corresponds to a fairly typical end-user computing environment.

The queries were generated by the following simple random process. A sequence of selectivity thresholds $s \in [1000, 10000, 100000, 1M]$ is used and for each value of s 100 queries is generated. Each query consists of n random attributes whose selectivity is greater than or equal to s, where n is uniformly sampled from {1, 2, 3, 4, 5}.

Figure 3:
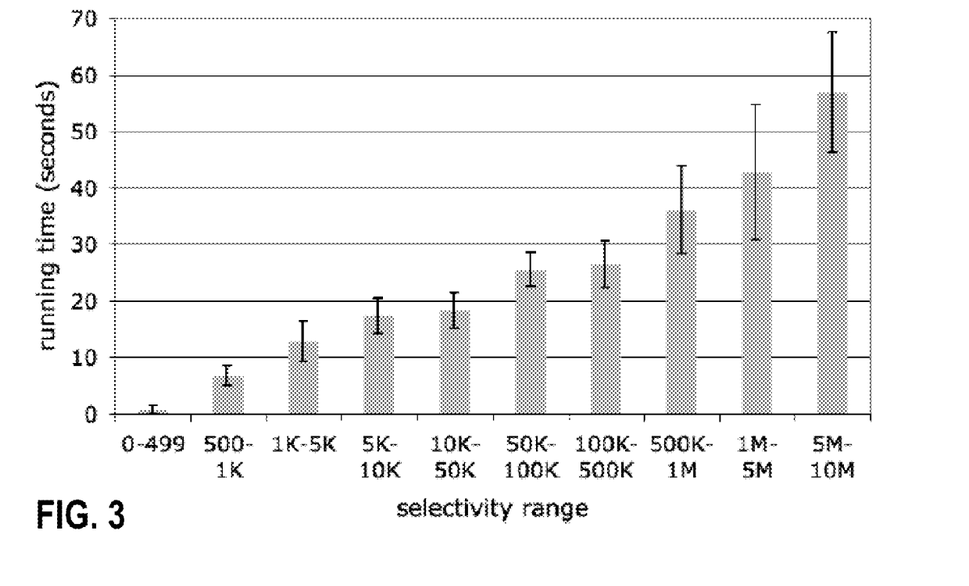
FIG. 3 is a graph showing the average time to answer a query, grouped by overall query selectivity, in accordance with an embodiment of the present invention.

FIG. 3 is a graph showing the average time to answer a query, grouped by overall query selectivity, in accordance with an embodiment of the present invention. Query performance using indexed retrieval (average running time). As expected, queries with higher selectivity take longer to process. For queries of selectivity more than 1000, the running time tends to be ten seconds or more, which is too slow for interactive interfaces.

Figure 4:
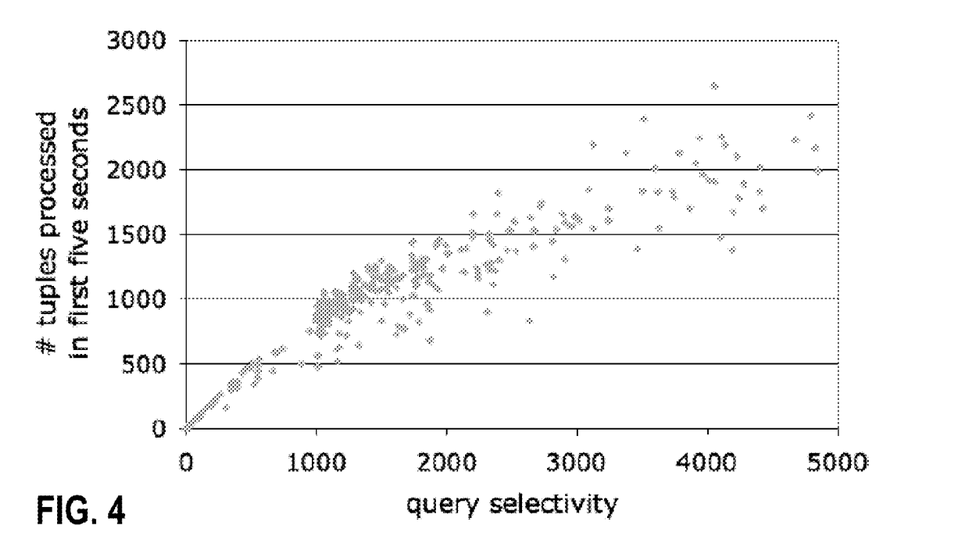
FIG. 4 is a graph showing an example of query performance using indexed retrieval, in accordance with an embodiment of the present invention.

FIG. 4 is a graph showing an example of query performance using indexed retrieval, in accordance with an embodiment of the present invention. Suppose five seconds is the cutoff for the response time of an interactive-speed application. FIG. 4 shows the number of tuples processed in the first five seconds of query execution. Each point on the graph corresponds to one query, with the query selectivity on the x-axis and number of tuples processed in the first five seconds on the y-axis. The idea behavior is for all points to lie on the line x=y. The points corresponding to queries of selectivity below 500 mostly lie on this line. In other words, all matching tuples were processed in under five seconds. As query selectivity increases beyond 500, queries start to fall below the x=y line, meaning that not all tuples were able to be processed in the first five seconds.

In the worst case, each tuple retrieval requires a random disk seek. A typical commodity disk seek time is around 10 ms, which permits 500 random seeks in five seconds. A query of low selectivity tends to have its matches spread thinly across the disk, thus requiring nearly s disk seeks for a query of selectivity $s \ll n$. This fact explains why the points in FIG. 4 remain close to the x=y line until the 500 selectivity mark.

Beyond that threshold, the number of tuples processed in under five seconds increases at a rate slower than x=y. Here, the processing rate increase is primarily driven by the increasing density of query matches, which permits more tuples to be processed for a given number of disk reads, and also increases the fraction of sequential disk reads compared to random seeks.

The curve reaches its maximum at around 1.8 M tuples processed (not shown), which corresponds to a rate of 360 tuples per millisecond. This number represents the maximum CPU (central processing unit) processing rate—for very high selectivities, the disk access pattern is predominantly sequential so the disk hardware is able to feed tuples to the CPU at a very fast rate.

In a conventional information retrieval setting, the time required to process all matching tuples is irrelevant, because the index is only used to fetch the top few (e.g., top 10) results. In the present context, however, aggregation is required over the entire result set, which is too slow for queries with a large number of matches.

Section 2.4.2: Precomputation

A standard way to enable real-time interaction with data is to precompute query results in an initial offline phase, and to store and index the query results for efficient on-demand retrieval. This is the approach taken in regular OLAP techniques, which precompute all queries allowed under the query model (i.e., the entire underlying datacube). More elaborate approaches only precompute the regions of the cube that aggregate a substantial amount of raw data, which can be much fewer than the full cube.

In the present context, it is preferable to rely on precomputation to handle queries that are too slow under the index-based approach of Section 2.4.1. That would mean precomputing offline the answers to queries with selectivity values between 1000 and whatever, which are clearly too slow to compute online via the techniques explored so far, as shown above in Section 2.4.1. (Even some queries with selectivity between 500 and 1000 are a bit too slow relative to the target time of five seconds, but starting at 1000 the majority of queries take substantially longer than five seconds, which is why 1000 is the present threshold.)

Unfortunately, given the high dimensionality of the present data, it is infeasible to precompute all queries that are too slow to compute on the fly. Let a query q with selectivity $q(s) \geq s^*$ be termed as dense, where $s^*$ is the maximum selectivity value for which random seeks are sufficiently fast (e.g., $s^*=1000$). In the web crawl data set described in Section 2.3, there are roughly 18,000 dense single-attribute queries. The number of dense two-attribute queries is about 600,000, and there are nearly 8,000,000 dense three-attribute queries. The number of dense queries with four or more attributes is not counted, because even just considering queries with up to three attributes, 8,000,000 aggregates cannot be computed in a reasonable amount of time, even for an offline precomputation phase.

Section 3: Index Ordering to Reduce Seeks

As shown in Section 2.4 above, low-selectivity queries require few disk accesses and even if they are all random seeks the overall running time is acceptable. Very-high-selectivity queries incur few seeks and can be stopped early due to statistical resolution. Queries with moderate selectivity are problematic because they incur many random seeks.

Figure 5:
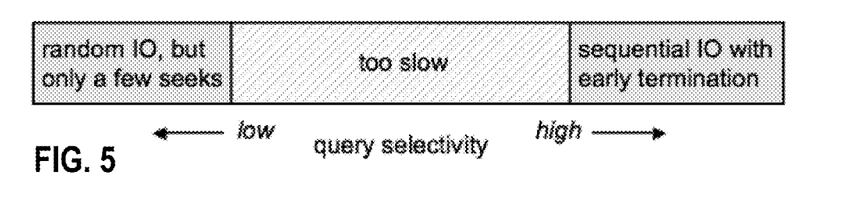
FIG. 5 is a diagram that summarizes the impact of query selectivity on response time, in accordance with an embodiment of the present invention.

FIG. 5 is a diagram that summarizes the impact of query selectivity on response time, in accordance with an embodiment of the present invention. What is needed is a way to reduce the number of seeks for queries of moderate selectivity. Techniques to alleviate seeks on indexed data do exist. For low-dimensional indexing over ordered attributes, special bulk-loading techniques have been devised to reduce the number of random seeks incurred by range queries. For one-dimensional indexes (e.g., B-trees), one simply orders the underlying data by the attribute to be indexed, prior to constructing the index. For indexes with a small number of numerical dimensions (e.g., R-trees), space-filling curve techniques, such as z-ordering and the Hilbert curve, can be used.

In the present context, however, because queries define arbitrary subsets of the data, there generally is no way to arrange the data sequentially such that each query's matches are contiguous or even near-contiguous. Fortunately, strict contiguousness is not required. The number of seeks just need to be kept below a threshold. So, low-selectivity queries are of no concern. For the remaining queries, it is an aim to partially cluster the data by query to reduce, but not eliminate, seeks.

In view of the above considerations, the following bulk-loading heuristic, called semi-clustering, is provided. Let $s^*_r$ denote the maximum selectivity value for which random seeks are sufficiently fast. Let $\ddot{A}=(\ddot{A}_1, \ddot{A}_2, \ldots, \ddot{A}_l)$ denote the list of attributes whose selectivity is above $s^*_r$, ordered in ascending order of selectivity, in other words, $s^*_r \leq s(\ddot{A}_1) \leq s(\ddot{A}_2) \leq \ldots \leq s(\ddot{A}_l)$. For a given tuple t, let $m(t) = \min\{k \in [1,l]: \ddot{A}_k(t)\}$, in other words, the index of the earliest attribute in $\ddot{A}$ for which t is a match. Semi-clustering uses m(t) as the ordering function for bulk-loading the index.

Figure 6:
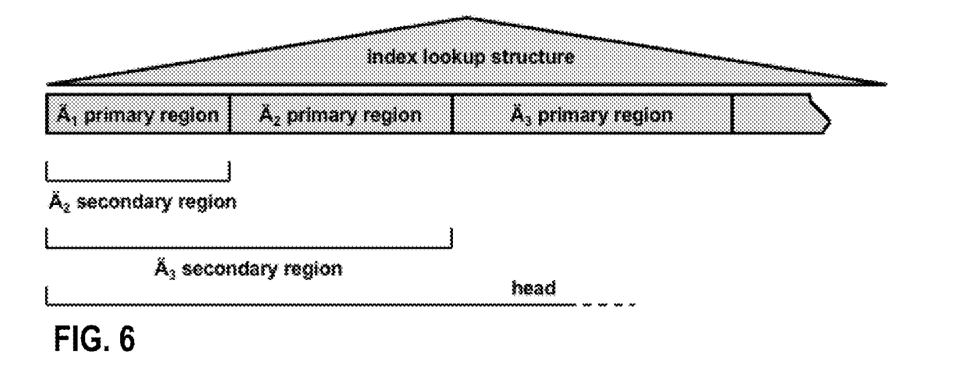
FIG. 6 is an index with semi-clustered organization, in accordance with an embodiment of the present invention.

FIG. 6 is an index with semi-clustered organization, in accordance with an embodiment of the present invention. Illustrated here is the effect of semi-clustering. Recall from Section 2.4.2 the definition of a dense query or attribute as being one whose selectivity is above the threshold $s^*_r$ for efficient processing via a randomly-ordered text index. For a given dense attribute $\ddot{A}_k$, the contiguous sequence of tuples having $m(t)=k$ is called $\ddot{A}_k$'s primary region. The concatenation of the primary regions of attributes $\ddot{A}_1, \ddot{A}_2, \ldots \ddot{A}_{k-1}$ is called $\ddot{A}_k$'s secondary region. The first few primary regions are called the head of the data set.

Attribute $\ddot{A}_k$'s matches are all located in $\ddot{A}_k$'s primary and secondary regions. Matches located in the primary region are contiguous. So, only one seek is incurred to fetch all of them. While matches in the secondary region may not be contiguous, the entire region is of size at most $$\sum_{i \in [1, k-1]} s(\ddot{A}_i),$$

in other words, the sum of the selectivities of the attributes with smaller selectivity than $\ddot{A}_k$. Hence, for small to intermediate values of k, the secondary region is relatively small and can be scanned quickly.

Even attributes with large values of k receive some benefit, because a substantial prefix of the secondary region is likely to be found cached in main memory, since the head of the data set is accessed for virtually every query. Lastly, multi-attribute queries have result sets that are subsets of the result sets of single-attribute queries, and hence benefit from similar locality properties as single-attribute queries.

Overall, this scheme yields significantly improved query time for a wide range of queries. However, queries with high selectivity may still be too slow to feel interactive for the user. Queries with extremely high selectivity can use a second, randomly-ordered index and be terminated early with a statistical approximation guarantee (i.e., sampling). For the rest, the perceived response time can be reduced by computing likely follow-on queries in the background, as discussed next.

Section 4: Adaptive Background Computation

Even with the index ordering optimization described in Section 3, some queries may be slower than desired. One solution is to precompute answers to slow queries. Unfortunately, as shown in Section 2.4.2, it is not feasible to precompute answers to all (slow) queries offline. That said, there may be an opportunity to selectively precompute certain query answers in an online fashion, as described below.

An advantageous fact is that users do not pose random queries, but instead tend to pose sequences of related queries. Accordingly, one common pattern is drill-down, in which a user starts with an initial query $q_1=\{A_1, A_2, \ldots, A_k\}$; and then formulates a new query $q_2=\{A_1, A_2, \ldots, A_k, A_{k+1}\}$, and then $q_3=\{A_1, A_2, \ldots, A_k, A_{k+1}, A_{k+2}\}$, and so on.

For example, suppose Sue, a member of a search engine company's crawler development team, wishes to understand the crawler's coverage of the China market. She launches the aggregation device and issues the query $q_1=\{\text{Chinese}\}$, and displays the resulting visualization in a meeting. Sue's colleague points out that the presence of duplicate web pages can cause the visualization to be misleading. So, Sue refines the query to $q_2=\{\text{chinese}, \neg \text{duplicate}\}$, causing the display to update accordingly. Another colleague asks whether the visualization includes spam pages, which leads to a third refinement $q_3=\{\text{chinese}, \neg \text{duplicate}, \neg \text{spam}\}$. A third colleague wishes to contrast coverage of static content with dynamic content. So, Sue issues $q_4=\{\text{chinese}, \neg \text{duplicate}, \neg \text{spam}, \neg \text{dynamic}\}$ followed by $q_5=\{\text{chinese}, \neg \text{duplicate}, \neg \text{spam}, \text{dynamic}\}$.

In general, given a sequence of queries $q_1, q_2, \ldots, q_k$ seen so far, the next query is more likely to be a drill-down of one of $q_1, q_2, \ldots, q_k$ than a random query. (A similar situation occurs in OLAP, text search and faceted search environments, which is why those systems provide explicit shortcuts for drill-down in the form of user-interface widgets or "query suggestions.") Given that observation, the system can take advantage of the user's "think time" between queries to compute answers to anticipated drill-down queries. This precomputation work must occur in the background in an interruptible process that terminates as soon as the user issues a new query.

Since the background computation will have limited time to execute, to maximize its effectiveness, the system should only precompute queries that are too slow to execute on the fly. For example, the system should only precompute dense queries, which are ones with selectivity greater than s* as defined in Section 2.4.2. Query selectivity can be estimated using various statistical techniques. For simplicity, the present implementation uses a hashed counter technique to identify most, but not all, pairs of attributes that cause query selectivity to fall below s*, in a time-and-space-efficient manner in an initial preprocessing phase. During online interaction, the only queries scheduled for background computation are ones that (1) are direct drill-downs of the user's current query, and (2) do not contain any attribute pairs that are known to have selectivity below s*, based on the hashed counter result.

Given a set of d potentially-dense drill-downs of query q to compute, one implementation strategy is to perform d independent index lookups. A second strategy discussed below is also considered.

Figure 7:
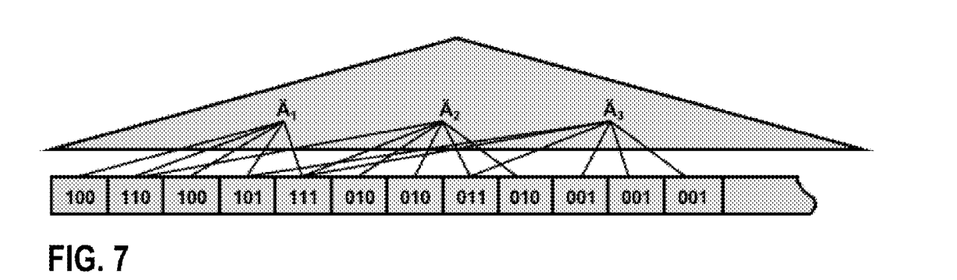
FIG. 7 is an index with forward bitmaps, in accordance with an embodiment of the present invention.

FIG. 7 is an index with forward bitmaps, in accordance with an embodiment of the present invention. This strategy enables all d drill-down queries to be computed simultaneously via a single index lookup. The idea is to store a forward bitmap with each tuple t, giving the value of $Ä_i(t)$ for each i∈[s*,m]. To compute answers to a set of d drill-downs from query q, one aggregator for each drill-down is initialized, and the index is used to scan the set of tuples matching q. For each match t, the forward bitmap is used to determine the set of drill-downs for which t is a match, and feed t to the corresponding aggregators.

If d is small, the independent lookup strategy is likely to perform best. However, if d is large, the overhead associated with d independent index lookups becomes substantially high and the bitmap-based strategy becomes more attractive.

Section 5: Overview of Method

Figure 8:
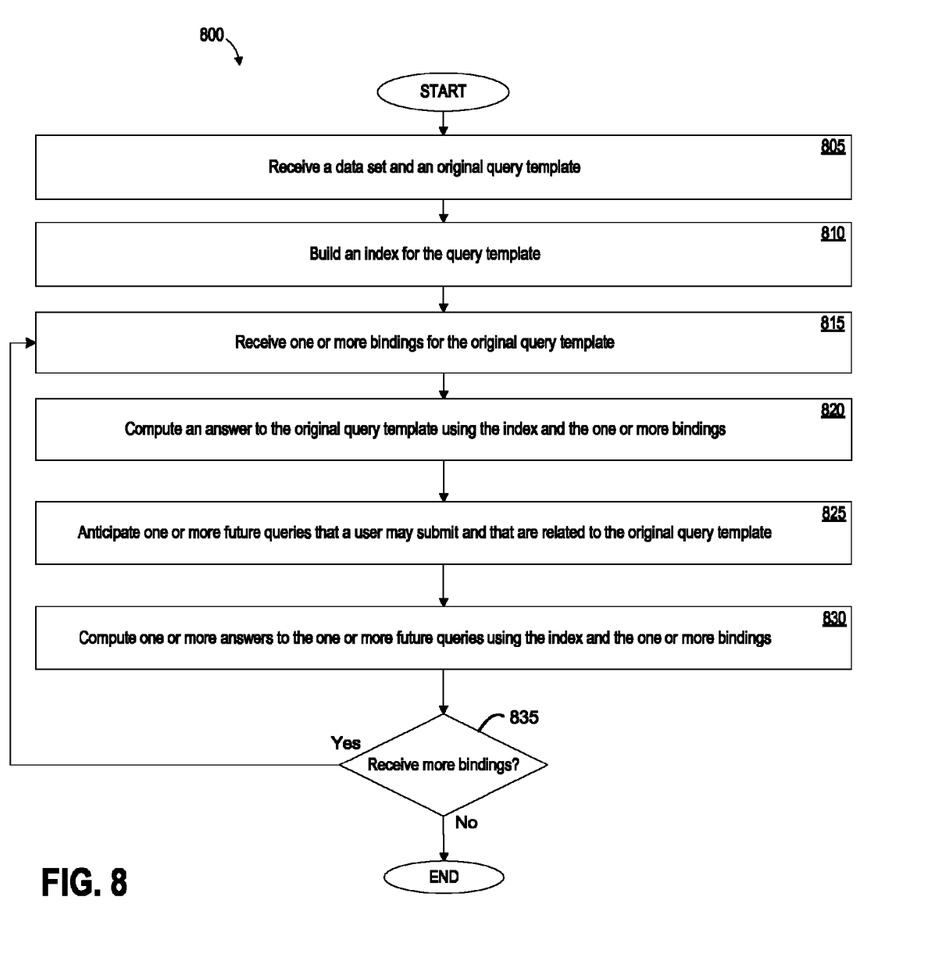
FIG. 8 is a flowchart of a method for exploring a large textual data set via interactive aggregation, in accordance with an embodiment of the present invention.

FIG. 8 is a flowchart of a method 800 for exploring a large textual data set via interactive aggregation, in accordance with an embodiment of the present invention. The steps of the method 800 may be carried out by the aggregation device 115 of FIG. 1. The method 800 starts in step 805 where the system receives a data set and an original query template. The method 800 then moves to step 810 where the system builds an index for the query template. The system uses techniques of Sections 3 and 4 to build the index. In other words, the system orders the index a certain way and inserts forward bitmaps.

Next, in step 815, the system receives one or more bindings for the original query template. These bindings may be defined by the user at the user computer. The method 800 proceeds to step 820 where the system computes an answer to the original query template. The system computes this answer using the index and the one or more bindings. Then, in step 825, the method 800 anticipates one or more future queries that the user may submit and that are related to the original query template. The method 800 then moves to step 830 where the system computes one or more answers to the one or more future queries. The system computes these answers using the index and the one or more bindings.

Next, in decision operation 835, the method 800 determines if there are more bindings being received from a user computer of the user. For example, the user may manipulate the bindings so that the system computes different results. If the system is receiving more bindings from the user, then the method 800 returns to step 815 and continues. However, if the system is not receiving more bindings from the user, then the method 800 is at an end.

Note that the method 800 may include other details that are not discussed in this method overview. Other details are discussed above with reference to the appropriate figures and may be a part of this method depending on the embodiment.

Section 6: Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include without limitation device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation receiving a large textual data set and an original query template, building an index for the query template, wherein the building the index comprises ordering the index a particular way to optimize query time, receiving one or more bindings for the original query template, computing an answer to the original query template using the index and the one or more bindings, and anticipating one or more future queries that a user may submit and that are related to the original query template.

Section 7: Advantages

An aggregation device is provided for interactive exploration of very-high-dimensional text data sets. Since precomputation of all possible query variations is infeasible, and on-the-fly index lookup can be too slow, two new techniques are introduced: (1) a novel semi-clustered index organization, to reduce seeks for index lookups, and (2) adaptive background computation of likely follow-on queries, via a novel bitmap-based multiquery processing technique.

It has been shown that semi-clustering approach substantially outperforms random ordering, and that the bitmap-based multiquery computation approach is much faster than independent lookups of individual queries. The semi-clustering approach substantially reduces the time it takes to answer a given user query (i.e., the time to answer a particular user query with the semi-clustering is substantially less than a time to answer the particular user query without the semi-clustering). The bitmap approach enables more query answers to be prepared ahead of time for the user, thereby reducing perceived query response time on average. In combination, these techniques represent a significant step toward enabling interactive-speed exploration of textual data sets.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving, via at least one computer, a data set and a query template, the data set comprising a plurality of attributes for a plurality of web pages;
   organizing, via the at least one computer, the query template based on a number of seeks of the data set needed to fetch data associated with the query template, the organizing comprising identifying a plurality of dense attributes from the plurality of attributes, each dense attribute having a selectivity exceeding a maximum query selectivity threshold;
   building, via the at least one computer, an index for the query template after the query template is organized, the index is organized into a plurality of sections based on a number of seeks of the data set needed to fetch data associated with the query template, the plurality of sections comprising a plurality of primary sections and a plurality of secondary sections, each dense attribute of the plurality having a corresponding primary section and each secondary section having a corresponding dense attribute that is denser than one or more other dense attributes of the plurality;
   receiving, via the at least one computer, one or more bindings for the query template, the bindings comprising query restrictions;
   computing, via the at least one computer, an answer to the query template by using the index and the bindings; and
   precomputing, via the at least one computer, answers for one or more future queries that a user may submit to explore the data set, wherein the future queries comprise query terms of the query template and at least one additional query term.

2. The method of claim 1, further comprising computing one or more answers to the one or more future queries using the index and the one or more bindings.

3. The method of claim 1, wherein the building the index further comprises semi-clustering the data set according to the query template.

4. The method of claim 3, wherein the semi-clustering does not involve random ordering of the index, and wherein a time to answer a particular user query with the semi-clustering is substantially less than a time to answer the particular user query without the semi-clustering.

5. The method of claim 1, further comprising at least one of:
   precomputing a set of drill-down queries from the query template;
   determining that the set of drill-down queries is small; and
   computing answers to the drill-down queries using an independent lookup strategy.

6. The method of claim 1, further comprising inserting forward bitmaps into the index.

7. The method of claim 6, further comprising at least one of:
   precomputing drill-down queries from the query template;
   determining that the set of drill-down queries is large; and
   computing answers to the drill-down queries simultaneously via a single index lookup.

8. The method of claim 1, further comprising at least one of:
   determining that the query template is a candidate for precomputing; and
   precomputing an answer to the query in an online fashion.

9. The method of claim 8, wherein the query is a dense query, and wherein the precomputing occurs in a background in an interruptible process that terminates soon after a new query is received.

10. The method of claim 1, wherein a selectivity of the future queries is above a threshold.

11. A system, comprising at least one processor to execute and memory to store instructions to:
    receive the data set and a query template, the data set comprising a plurality of attributes for a plurality of web pages;
    organize the query template based on a number of seeks of the data set needed to fetch data associated with the query template, the organizing comprising identifying a plurality of dense attributes from the plurality of attributes, each dense attribute having a selectivity exceeding a maximum query selectivity threshold;
    build an index for the query template after the query template is organized, the index is organized into a plurality of sections based on a number of seeks of the data set needed to fetch data associated with the query template, the plurality of sections comprising a plurality of primary sections and a plurality of secondary sections, each dense attribute of the plurality having a corresponding primary section and each secondary section having a corresponding dense attribute that is denser than one or more other dense attributes of the plurality;
    receive one or more bindings for the query template, the bindings comprising query restrictions;
    compute an answer to the query template by using the index and the bindings; and
    precompute answers for one or more future queries that a user may submit to explore the data set, wherein the future queries comprise query terms of the query template and at least one additional query term.

12. The system of claim 11, the instructions further comprising instructions to compute one or more answers to the one or more future queries using the index and the one or more bindings.

13. The system of claim 11, the instructions further comprising instructions to semi-cluster the data set according to the query template.

14. The system of claim 13, wherein the semi-clustering does not involve random ordering of the index, and wherein a time to answer a particular user query with the semi-clustering is substantially less than a time to answer the particular user query without the semi-clustering.

15. The system of claim 11, the instructions further comprising instructions to perform for at least one of:
  precompute a set of drill-down queries from the query template;
  determine that the set of drill-down queries is small; and
  compute answers to the drill-down queries using an independent lookup strategy.

16. The system of claim 11, the instructions further comprising instructions to insert forward bitmaps into the index.

17. The system of claim 16, the instructions further comprising instructions to perform at least one of:
  precompute drill-down queries from the query template;
  determine that the set of drill-down queries is large; and
  compute answers to the drill-down queries simultaneously via a single index lookup.

18. The system of claim 11, the instructions further comprising instructions to perform at least one of:
  determine that the query template is a candidate for pre-computing; and
  precompute an answer to the query in an online fashion.

19. The system of claim 18, wherein the query is a dense query, and wherein the precomputing occurs in a background in an interruptible process that terminates soon after a new query is received.

20. The system of claim 11, wherein a selectivity of the future queries is above a threshold.

21. A non-transitory computer readable medium carrying one or more instructions that when executed by one or more processors, cause the one or more processors to:
  receive the data set and a query template, the data set comprising a plurality of attributes for a plurality of web pages;
  organize the query template into a plurality of sections based on a number of seeks of the data set needed to fetch data associated with the query template, the organizing comprising identifying a plurality of dense attributes from the plurality of attributes, each dense attribute having a selectivity exceeding a maximum query selectivity threshold;
  build an index for the query template after the query template is organized, the index is organized into a plurality of sections based on a number of seeks of the data set needed to fetch data associated with the query template, the plurality of sections comprising a plurality of primary sections and a plurality of secondary sections, each dense attribute of the plurality having a corresponding primary section and each secondary section having a corresponding dense attribute that is denser than one or more other dense attributes of the plurality;
  receive one or more bindings for the query template, the bindings comprising query restrictions;
  compute an answer to the query template by using the index and the one or more bindings; and
  precompute answers for one or more future queries that a user may submit to explore the data set, wherein the future queries comprise query terms of the query template and at least one additional query term.

* * * * *